(12) United States Patent
Tiszai

(10) Patent No.: US 6,470,881 B1
(45) Date of Patent: Oct. 29, 2002

(54) HEATER AND HEAT EXCHANGER RETAINING CLIPS

(75) Inventor: Joseph J. Tiszai, Fairfield, OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 09/589,104

(22) Filed: Jun. 8, 2000

(51) Int. Cl.[7] ................................................. A47J 27/00
(52) U.S. Cl. ....................... 126/391.1; 99/403; 165/171; 248/74.2
(58) Field of Search ....................... 126/391.1; 99/403, 99/407; 165/171, 162, 178, 163; 285/134.1, 188, 135.1, 135.2; 431/343; 248/74.2, 74.1, 74.4, 68.1, 74.5

(56) References Cited

U.S. PATENT DOCUMENTS

| | | | | |
|---|---|---|---|---|
| 722,956 A | * | 3/1903 | Doughty | 294/170 |
| 2,940,162 A | * | 6/1960 | Sandberg | 165/171 |
| 3,016,220 A | * | 1/1962 | Rose | 248/74.5 |
| 3,144,079 A | * | 8/1964 | Mack | 165/171 |
| 3,194,524 A | * | 7/1965 | Trumbull | 248/74.2 |
| 3,486,531 A | * | 12/1969 | Nalodka | 248/74.2 |
| 4,259,942 A | * | 4/1981 | Katz | 165/171 |
| 4,842,227 A | * | 6/1989 | Harrington et al. | 248/68.1 |
| 5,209,441 A | * | 5/1993 | Satoh | 248/74.2 |
| 5,211,900 A | * | 5/1993 | Ziegler | 165/171 |
| 5,402,713 A | * | 4/1995 | King | 126/391.1 |
| 5,464,179 A | * | 11/1995 | Ruckwardt | 248/74.2 |
| 5,797,451 A | * | 8/1998 | Grant | 165/171 |

FOREIGN PATENT DOCUMENTS

| | | | | |
|---|---|---|---|---|
| GB | 2 314 903 A | * | 1/1998 | |
| NL | 71383 A1 | * | 12/1952 | 165/171 |
| WO | WO 96/39072 A | * | 12/1996 | |

* cited by examiner

Primary Examiner—Henry Bennett
Assistant Examiner—Josiah C. Cocks
(74) Attorney, Agent, or Firm—Baker Botts L.L.P.

(57) ABSTRACT

A clip for securing a plurality of tubes to each other includes a rectangular separator plate and a first concave arm and a second concave arm. The separator plate has a first edge and a second edge. The first concave arm has a first end that is integrally formed with the first edge. A second end of the first concave arm includes a first tip that curls inwardly to grasp a first tube. A second concave arm has a second end that is integrally formed with the second edge. A second end of the second concave arm includes a second tip that curls inwardly to grasp a second tube.

7 Claims, 5 Drawing Sheets

HEATER AND HEAT EXCHANGER RETAINING CLIPS

BACKGROUND OF THE INVENTION

1. Field of the Invention

The present invention relates generally to apparatus and methods for manufacturing apparatus for securing a plurality of heater and heat exchanger tubes to each other. More particularly, the present invention relates to retaining clips and methods for manufacturing retaining clips for securing pairs of heater and heat exchanger tubes to each other.

2. Description of Related Art

Food fryers, such as deep fat fryers or liquid shortening fryers, use a molten cooking medium to cook food. Cooking mediums for use in such fryers are heated by heater or heat exchanger tubes, which pass through or around the circumference of fryer vats, which hold the cooking medium. When such tubes pass through the fryer vat, the tubes generally are placed deep in the vat, and containers for holding food during cooking are rested on or suspended above the tubes. However, when the tubes run around the circumference of the fryer vat, containers for holding food during cooking are suspended within the tubes.

In this latter configuration, the food containers may come into contact with the tubes. Because metal cooking baskets or trays may strike and damage the surrounding tubes, the fryer tubes are secured to each other in order to ensure increased or maximized clearance for the food containers. Further, guards or bumpers may be affixed to the tubes in order to fend off the food containers. Such guards are intended to reduce the likelihood and severity of tube damage when the containers are inserted or removed from the vat or when the containers shift within the vat during cooking.

Referring to FIG. 1, a perspective view of a known heat exchanger securing apparatus 10, including a heat exchanger clamp 11 and a corresponding clamp tap bar 17, is depicted. Clamp 11 is designed to secure a plurality of tubes to each other and to be itself secured by fasteners to the flyer vat walls. Consequently, clamp 11 includes a plurality of grooves 13, each formed to receive a heater or heat exchanger tube (not shown). At evenly spaced intervals, clamp 11 is equipped clamp securing taps 15. Taps 15 pass through the width of clamp 11 and correspond to bar securing taps 19 formed in bar 17.

In current use, bar 17 is placed between the tubes and a fryer vat wall. Grooves 13 of clamp 11 then are aligned with the tubes. Finally, fasteners, such as screws or bolts, are threaded through taps 15 in clamp 11 and taps 19 in bar 17 and are secured to openings, such as threaded openings, formed in the fryer vat wall.

An apparatus, similar to that depicted in the FIG. 1, is shown in FIG. 1 of U.S. Design Pat. No. Des. 351,966, which is incorporated herein by reference in its entirety. In FIG. 1 of the design patent, a plurality of tubes are shown secured to each other and to the fryer vat walls by clamps.

As is shown in FIG. 1, clamp 11 extends beyond the tubes and acts as a guard or bumper to protect the tubes from food container damage, but this configuration also may reduce the available cooking volume within the tube circumference or may limit the size of food containers, which may be placed within the circumference of the tubes. Referring to FIG. 2, however, a perspective view of a known tube guard strap 20 is depicted. Strap 20 is designed to tightly surround the tube (not shown). Strap 20 has a flange 22 to ensure proper separation between the tubes and may be secured at a particular point on a tube by threading a fastener through a fastener hole 24 and securing strap 20 to the tube by tightening the fastener. The ability to securely position such guards is important because not all tube areas are subject to the same wear. In addition, straps 20 are formed with opposing flat surfaces 26, which are designed to bear the brunt of food container wear and to help seat the tubes flush against the fryer vat walls.

SUMMARY OF THE INVENTION

Therefore, a need has arisen for an inexpensive and easy to install apparatus for securing a plurality of heater and heat exchanger pipes to each other. Further, a need has arisen for an inexpensive and easy to install apparatus for guarding against damage to heater and heat exchanger pipes.

It is an object of the present invention that the apparatus use less material to manufacture and may be manufactured with fewer steps than the known apparatus. It is a feature of the apparatus of this invention that it is manufactured as a single component and does not require machined parts. It is an advantage of this invention that a single component may both secure the tubes to each other and guard against container damage to the tubes.

It is a further object of the present invention that the apparatus is easier to install than the known apparatus and may be readily placed where needed to secure the tubes and to protect the tubes from wear. It is a feature of this apparatus that it may be affixed to the tubes without the use of fasteners, such as screws or bolts. It is an advantage of this apparatus that because it has only a single component and because the apparatus may be installed and removed from the interior of the fryer's vat, the apparatus is easy to remove, install, or replace. It is a further advantage of this ease of removal, installation, or replacement, that the apparatus provides more flexibility in the positioning of the apparatus for securing the heat and heat exchanger tubes or for guarding the tubes from wear, or both.

It is still another object of the present invention that the apparatus has a low profile configuration. It is a feature of this low profile configuration that it increases the available cooking volume within the circumference of the tubes. It is an advantage of this configuration that it reduces the likelihood that a food container will strike the tubes.

In an embodiment of the invention, an apparatus for securing a plurality of tubes to each other, comprises a separator plate, a first concave arm, and a second concave arm. The separator plate has a first edge and a second edge, and the first edge is substantially parallel to the second edge. The first concave arm has a first inner end abutting the first edge and has a first outer end. The second concave arm has a second inner end abutting said second edge and has a second outer end.

In another embodiment of the invention, an apparatus for securing a pair of tubes to each other, comprises a rectangular separator plate, a first concave arm, and a second concave arm. The rectangular separator plate has a first edge and a second edge. The first concave arm has a first end that is integrally formed with said first edge. A second end of the first concave arm comprises a first tip that may curl inwardly to grasp a first tube. The second concave arm has a second end that is integrally formed with said second edge. A second end of the second concave arm comprises a second tip that may curl inwardly to grasp a second tube.

In yet another embodiment of the invention, a fryer comprises a vat, a plurality of substantially parallel heat exchanger tubes housed within the vat, and at least one apparatus for securing at least a pair of the plurality of tubes to each other. The apparatus comprises a separator plate, a first concave arm, and a second concave arm. The separator plate has a first edge and a second edge. The first edge is substantially parallel to the second edge. The first concave arm has a first inner end abutting the first edge and has a first outer end. The second concave arm has a second inner end abutting the second edge and has a second outer end.

In still another embodiment of the invention, a method for manufacturing an apparatus for securing a plurality of tubes to each other, comprises the steps of providing a substantially rectangular plate and pressing the plate between a pair of die. The rectangular plate has a first plate end and a second plate end. The pressed plate is formed with a first concave portion adjacent to the first plate end and a second concave portion adjacent to the second plate end. The first concave portion is separated from the second concave portion by a planar portion.

Other objects, features, and advantages will be apparent to those skilled in the art in view of the following detailed description of preferred embodiments and the accompanying drawings.

BRIEF DESCRIPTION OF THE DRAWINGS

The present invention may be more readily understood with reference to the following drawings, in which.

DETAILED DESCRIPTION OF PREFERRED EMBODIMENTS

Figure 3:
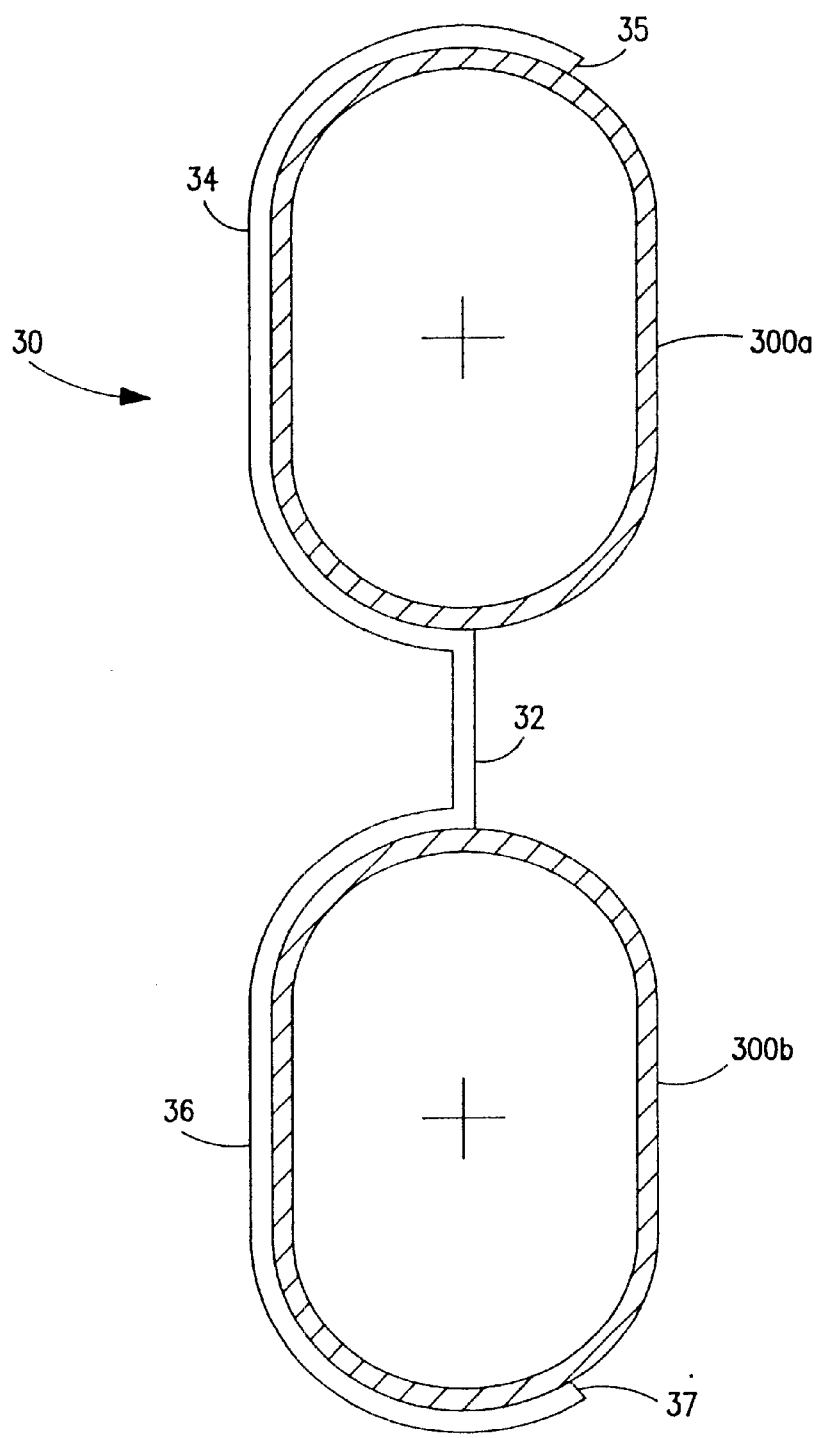
FIG. 3 depicts a side view of a clip according to this invention grasping a pair of heater tubes.

Referring to FIG. 3, a side view of a clip 30 according to this invention is shown grasping a pair of heater tubes. Clip 30 comprises a separator plate 32 having a first edge and a second edge. Separator plate 32 joins with a first concave arm 34 and a second concave arm 36. Each of arms 34 and 36 joins separator plate 32 at its first and second edges. Arms 34 and 36 have first and second outer ends, respectively. Finally, first concave arm 34 has a second end comprising a first tip 35 that curls inwardly to grasp a first tube 300a, and second concave arm 36 has a second end comprising a second tip 37 that curls inwardly to grasp a second tube 300b.

Preferably, clip 30 is manufactured from a flexible, but strong material, such as a metal (e.g., stainless steel or aluminum). Further, the material selected should be relatively impervious to the damaging effects of prolonged exposure to high heat and to the potentially corrosive and destructive effects of prolonged exposure to the cooking mediums. Alternatively, clip 30 may be manufactured from metal, ceramics, plastics, and the like.

Figure 4:
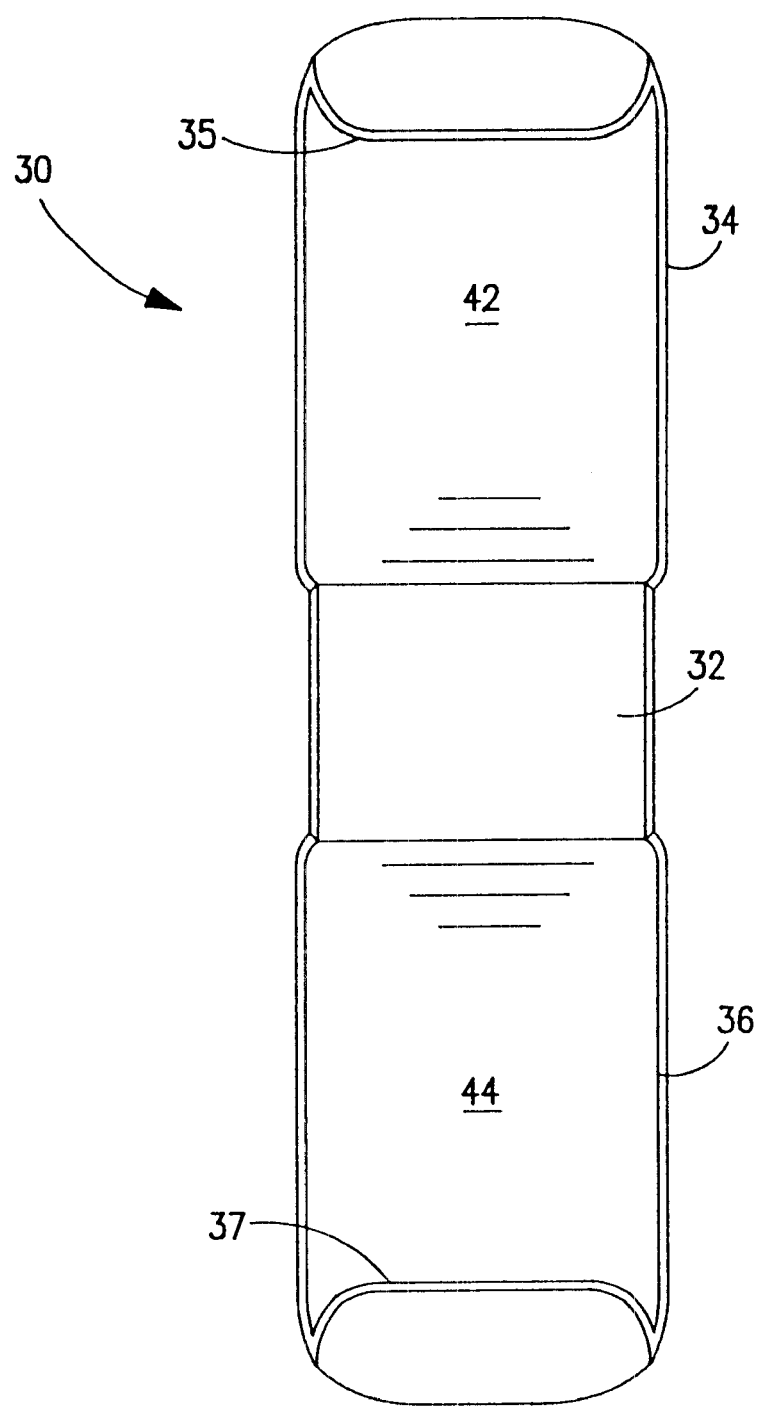
FIG. 4 depicts a plan interior view of the clip of FIG. 3.

In FIG. 4, a plan, interior view of clip 30 of FIG. 3 is shown. Again, clip 30 comprises a substantially rectangular separator plate 32 and shows two arms, first concave arm 34 and second concave arm 36, which are joined at their interior ends to the external ends of separator plate 32. In this figure, however, the first interior tube grasping surface 42 and the second interior tube grasping surface 44 are also shown. These surfaces are preferably configured to closely correspond to the outer surfaces of the tubes.

Figure 5:
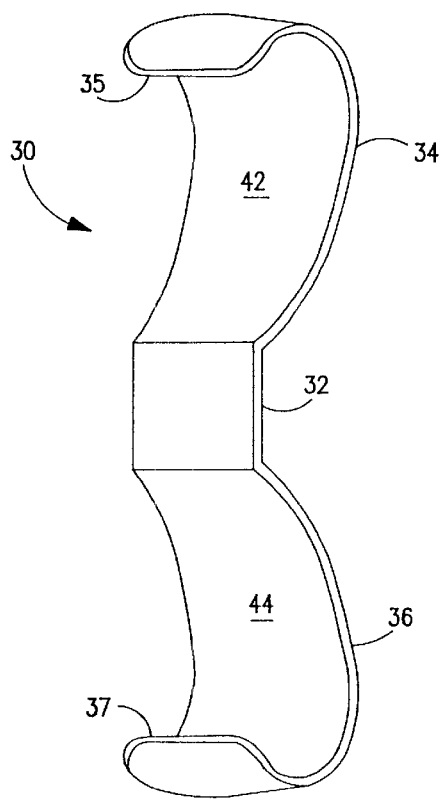
FIG. 5 depicts a perspective interior view of the clip of FIG. 3.

Referring to FIG. 5, a perspective, interior view of clip 30 of FIG. 3 is depicted. From FIGS. 4 and 5, it is clear that the surfaces 42 and 44 were adapted to the fit and grasp the tubes.

Figure 1:
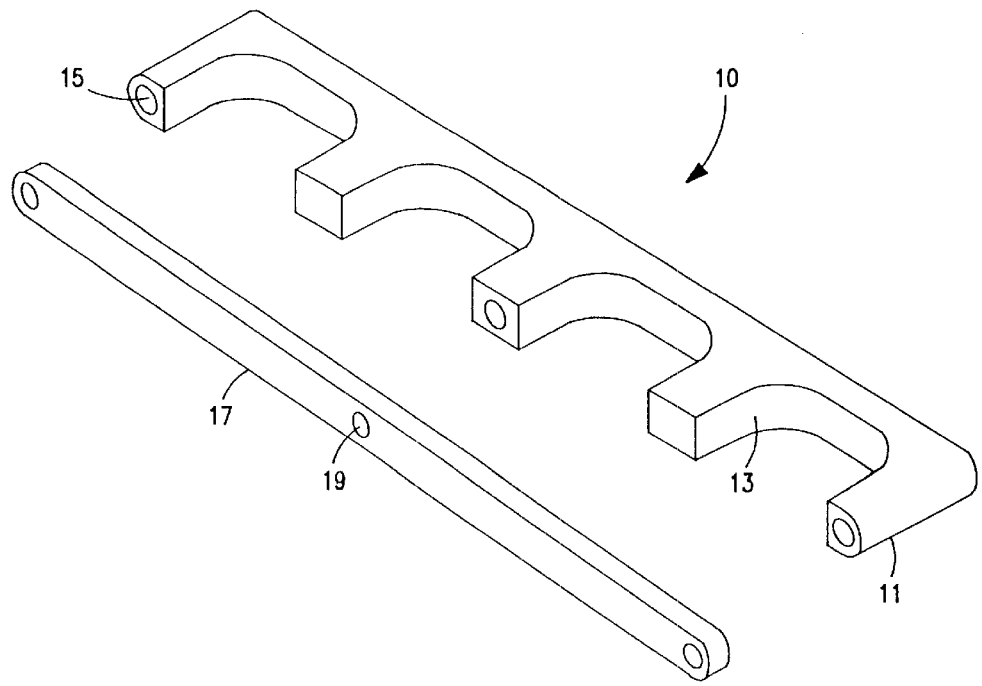
FIG. 1 depicts a perspective view of a known heat exchanger clamp and a corresponding clamp tap bar.
Figure 2:
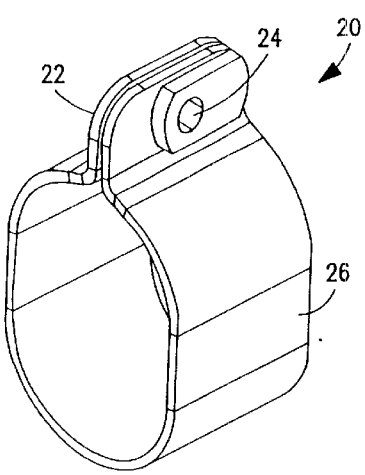
FIG. 2 depicts a perspective view of a known tube guard strap.
Figure 6:
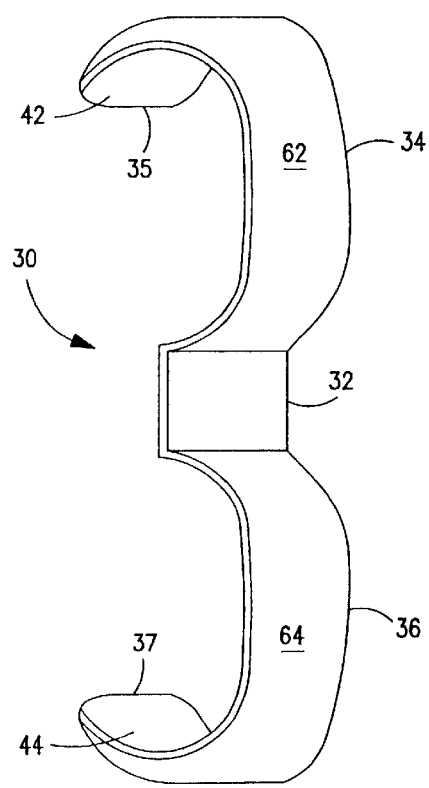
FIG. 6 depicts a perspective exterior view of the clip of FIG. 3.

FIG. 6 depicts a perspective, exterior view of clip 30 of FIG. 3. In addition to the other elements of the invention disclosed and discussed with respect to FIGS. 3–5, FIG. 6 depicts a first wear surface 62 and a second wear surface 64. First wear surface 62 is formed on an opposite convex surface of the first concave arm 34, and a second wear surface is formed on an opposite convex surface of the second concave arm 36. Wear surfaces 62 and 64 correspond to the guard surfaces 26, discussed above with respect to FIG. 2 (prior art). Nevertheless, guard surfaces 62 and 64 are integrally formed with clips 30. Thus, separate guards need not be affixed to the tubes.

Figure 7:
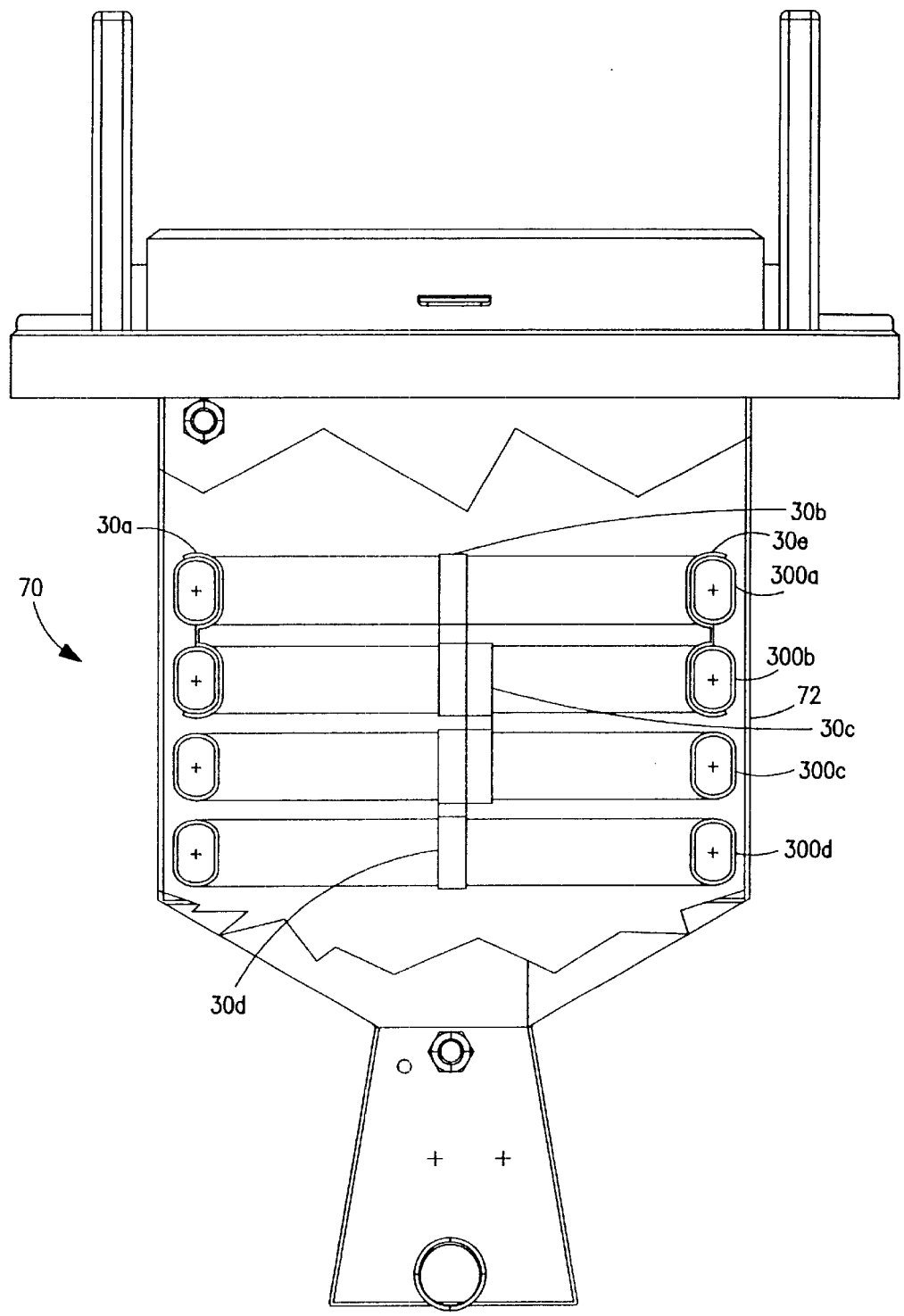
FIG. 7 depicts a cross-sectional view of a fryer having four parallel heat exchanger tubes secured with five clips, as shown in FIG. 3.

Finally, FIG. 7 depicts a cross-sectional view of a fryer 70. Fryer 70 includes a vat 72, which houses four parallel heat exchanger tubes 300a–d that are secured with five clips 30a–e, as shown in FIG. 3. In this figure, three clips 30b–d are fixed in a staggered pattern to secure the four tubes 300a–d along a rear wall of vat 72. One clip 30a secures tubes 300a and 300b along the left wall of vat 72, and one clip 30e secures tubes 300a and 300 along the right wall of vat 72. Because this figure depicts a cross-sectional view of fryer 70, the placement of clips along the front wall of vat 72 is not shown. Nevertheless, the particular configuration of clips 30 depicted in FIG. 7 is merely exemplary. The placement and number of clips used to secure tubes in a fryer may depend on the size of the vat and the unsupported length of the tubes. Further, the placement and number clips will depend on where wear or damage is detected or anticipated in the fryer.

Thus, in a preferred embodiment, the clip for securing a pair of tubes to each other, may comprise a rectangular separator plate, a first concave arm, and a second concave arm. The separator plate may have a first edge and a second edge. The first concave arm may have a first end that is integrally formed with the first edge and may have a second end comprising a first tip that may curl inwardly to grasp a first tube. The second concave arm may have a second end that is integrally formed with the second edge and may have a second end comprising a second tip that may curl inwardly to grasp a second tube. Further, this preferred embodiment may include a first wear surface formed on an opposite convex surface of the first concave arm and a second wear surface formed on an opposite convex surface of the second concave arm.

A fryer, according to this invention, may comprise a vat, a plurality of substantially parallel heat exchanger tubes, and at least one clip or apparatus for securing at least a pair of the plurality of tubes to each other. The plurality of substantially parallel heat exchanger tubes may be housed within the vat. The apparatus may comprise a separator plate, a first concave arm, and a second concave arm. The separator plate may have a first edge and a second edge, such that the first edge is substantially parallel to the second edge.

Thus, for example, the separator plate may be square or rectangular. The first concave arm may have a first inner end abutting the first edge and may have a first outer end. Similarly, the second concave arm may have a second inner end abutting the second edge and may have a second outer end.

The apparatus housed in the fryer vat further may comprise a first wear surface formed on an opposite convex surface of the first concave arm and a second wear surface formed on an opposite convex surface of the second concave arm. The first concave arm also may have a second end comprising a first tip that may curl inwardly to grasp a first tube, and the second concave arm has a second end comprising a first tip that curls inwardly to grasp a first tube.

The invention also may include a method for manufacturing a clip or an apparatus for securing a plurality of tubes to each other. This method may comprise the steps of: providing a substantially rectangular plate having a first plate end and a second plate end; and pressing the plate within a press, e.g., pair of die, or between to molded patterns to form a first concave portion adjacent to the first plate end and to form a second concave portion adjacent to the second plate end. Thus, the first concave portion is separated from the second concave portion by a planar portion, e the separator plate. Preferably, the planer portion may be square or rectangular. Moreover, apparatus made by this method are preferably made from metal, such as stainless steel or aluminum, or another similar flexible and moldable material.

The method further may comprise the steps of: forming a first tip at the first plate end, which is adapted to curl inwardly to grasp a first tube, and forming a second tip at the second plate end, which is adapted to curl inwardly to grasp a second tube. A first wear surface also may be formed on an opposite convex surface of the first concave portion, and a second wear surface may be formed on an opposite convex surface of the second concave portion. The present invention also is directed to apparatus manufactured according to this method.

Although the invention has been described with respect to preferred embodiments, the foregoing description and examples are intended to be merely exemplary of the invention. The true scope and spirit of the invention is not intended to be limited by the foregoing description and examples, but instead is intended to be commensurate with the scope of the following claims. Variations and modifications on the elements of the claimed invention will be apparent to persons skilled in the art from a consideration of this specification or practice of the invention disclosed herein.

What is claimed is:

1. A fryer comprising:
  a vat;
  a plurality of substantially parallel heat exchanger tubes housed within said vat;
  at least one apparatus for securing at least a pair of said plurality of tubes to each other, said apparatus comprising:
    a separator plate having a first edge and a second edge, wherein said first edge is substantially parallel to said second edge;
    a first concave arm having a first inner end formed integrally and substantially flush with said first edge and having a first outer end; and a second concave arm having a second inner end abutting said second edge and having a second outer end, wherein said first concave arm has a second end comprising a first tip that curls inwardly to grasp a first tube, and said second concave arm has a second end comprising a second tip that curls inwardly to grasp a second tube.

2. The fryer of claim 1, wherein said separator plate is rectangular.

3. The fryer of claim 1, further comprising a first wear surface formed on an opposite convex surface of said first concave arm and a second wear surface formed on an opposite convex surface of said second concave arm.

4. A method for manufacturing a fryer comprising the steps of:
  providing a vat;
  housing a plurality of heat exchanger tubes within said vat;
  securing said plurality of heat exchanger tubes within said vat, wherein the step of securing comprises the steps of:
    forming an apparatus for securing said plurality of heat exchanger tubes within said vat, wherein the step of forming comprises the steps of:
      providing a substantially rectangular plate having a first plate end and a second plate end;
      pressing said plate within a pair of die to form a first concave portion adjacent to said first plate end and to form a second concave portion adjacent to said second plate end, wherein said first concave portion is separated from said second concave portion by a planar portion; and
      forming a first tip at said first plate end, which is adapted to curl inwardly to grasp a first of said plurality of heat exchanger tubes, and forming a second tip at said second plate end, which is adapted to curl inwardly to grasp a second of said plurality of heat exchanger tubes;
    positioning said first of said plurality of heat exchanger tubes within said first concave portion; and
    positioning said second of said plurality of heat exchanger tubes within said second concave portion.

5. The method of claim 4, further comprising the steps of: forming a first wear surface on an opposite convex surface of said first concave portion and forming a second wear surface on an opposite convex surface of said second concave portion.

6. The method of claim 4, wherein said planar portion is rectangular.

7. A fryer manufactured by the method of claim 4.

* * * * *